(12) United States Patent
Slocum

(10) Patent No.: US 8,327,919 B2
(45) Date of Patent: Dec. 11, 2012

(54) APPARATUS AND METHOD FOR MODIFYING A MODULAR AIR PREHEATER

(75) Inventor: William D. Slocum, Belmont, NY (US)

(73) Assignee: ALSTOM Technology Ltd, Baden (CH)

( * ) Notice: Subject to any disclaimer, the term of this patent is extended or adjusted under 35 U.S.C. 154(b) by 932 days.

(21) Appl. No.: 12/409,911

(22) Filed: Mar. 24, 2009

(65) Prior Publication Data

US 2010/0243198 A1    Sep. 30, 2010

(51) Int. Cl.
  *F23L 15/02*    (2006.01)
  *F28D 17/00*    (2006.01)
  *B23P 26/00*    (2006.01)
(52) U.S. Cl. .......................... 165/8; 165/9; 29/890.034
(58) Field of Classification Search .................. 165/4, 8, 165/9, 10; 29/890.034
  See application file for complete search history.

(56) References Cited

U.S. PATENT DOCUMENTS

| | | | | |
|---|---|---|---|---|
| 3,267,562 A | * | 8/1966 | Casagrande et al. | 29/890.034 |
| 3,710,851 A | | 1/1973 | Finnemore | |
| 3,789,916 A | * | 2/1974 | Lindahl | 165/8 |
| 3,830,287 A | * | 8/1974 | Eisenstein | 165/10 |
| 3,891,029 A | * | 6/1975 | Mahoney | 165/8 |
| 3,998,266 A | * | 12/1976 | Finnemore | 165/8 |
| 4,418,742 A | * | 12/1983 | Conde et al. | 165/8 |
| 4,773,145 A | * | 9/1988 | Baker et al. | 29/890.034 |
| 4,960,166 A | * | 10/1990 | Hirt | 165/8 |
| 5,615,732 A | * | 4/1997 | Brophy et al. | 165/8 |
| 6,257,318 B1 | * | 7/2001 | Fierle et al. | 165/8 |
| 6,422,299 B1 | * | 7/2002 | Eriksson | 165/8 |
| 6,672,369 B1 | | 1/2004 | Brophy et al. | |
| 7,082,987 B2 | * | 8/2006 | Hamilton | 165/4 |

FOREIGN PATENT DOCUMENTS

| | | |
|---|---|---|
| JP | 32-004636 | 7/1957 |
| JP | 48-030137 | 4/1973 |
| JP | 2006-515412 | 5/2006 |

* cited by examiner

*Primary Examiner* — Ljiljana Ciric
(74) *Attorney, Agent, or Firm* — Robert D. Crawford

(57) ABSTRACT

A semi-modular rotor module [52] for a modified modular air preheater [10] has a two-pin lug assembly for engaging an air preheater post [16]. The two-pin lug assembly includes an upper two-pin lug [54] and a lower two-pin lug and is configured to occupy a sector sealing plate angle β. A plurality of diaphragms [56], [58], [60], [62] extend radially from the two-pin lug assembly, including two outer diaphragms [56], [62] positioned to define a sub-sector angle γ that is less than the sealing plate angle β. Stay plates [42] are between the diaphragms to define basket modules where heat exchange elements [22*a*] are received. A modular rotor can be modified by removing pairs of adjacent unitary rotor modules [20] and replacing each pair with the semi-modular rotor module [52].

13 Claims, 5 Drawing Sheets

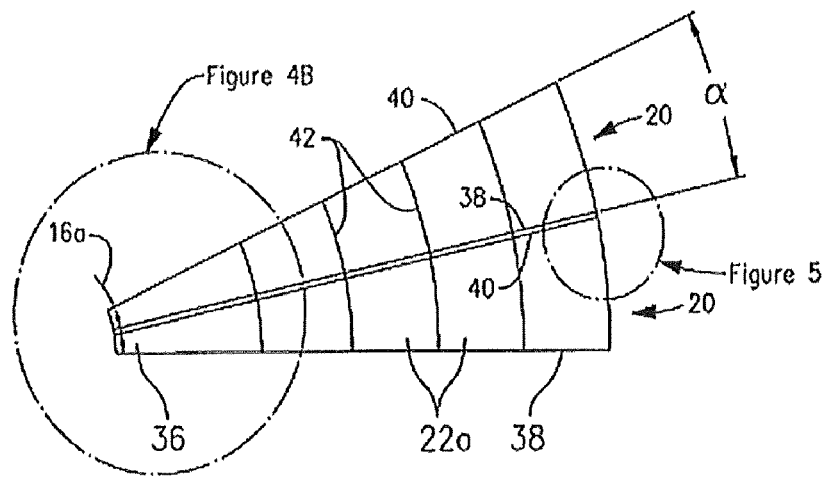
Figure 4A
(PRIOR ART)
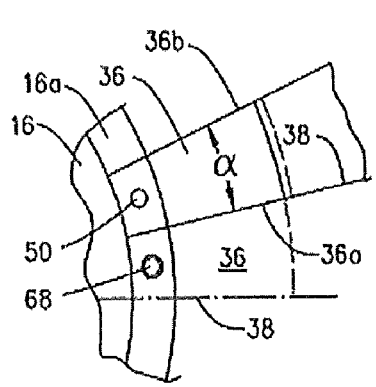
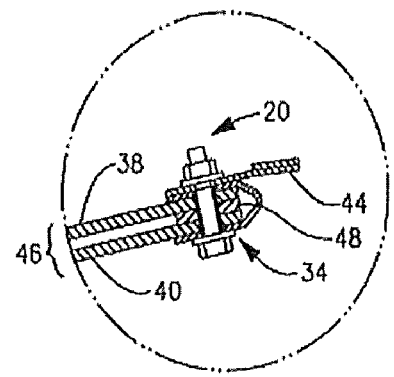
Figure 4B
(PRIOR ART)
Figure 5
(PRIOR ART)

APPARATUS AND METHOD FOR MODIFYING A MODULAR AIR PREHEATER

BACKGROUND OF THE INVENTION

1. Field of the Invention

This invention relates to air preheaters and in particular to the modification of modular air preheaters.

2. Description of Related Art

An air preheater (also known as a rotary heat exchanger) is employed to transfer heat from a hot gas stream such as, for example, a flue gas stream, to a cold gas stream such as, for example, combustion air stream. A rotor contains a mass of heat absorbent material which is first positioned in a passageway for the hot gas stream where heat is absorbed by the heat absorbent material. As the rotor turns, the heated absorbent material enters the passageway for the cold gas stream where the heat is transferred from the absorbent material to the cold gas stream.

In a typical air preheater, a cylindrical rotor is disposed on a central rotor post and divided into a plurality of sector-shaped compartments ("sectors") by a plurality of radial partitions or plates, known as diaphragms, extending from the rotor post to the outer peripheral shell of the rotor. These sector shaped compartments are loaded with modular heat exchange baskets which contain the mass of heat absorbent material commonly comprised of stacked plate-like elements.

SUMMARY OF THE INVENTION

According to aspects disclosed herein, there is provided a semi-modular rotor module for an air preheater. The semi-modular rotor module has a two pin lug assembly for engaging an air preheater post. The lug assembly includes an upper two pin lug and a lower two pin lug and is configured to occupy a sector plate sealing angle. A plurality of diaphragms extends radially from the lug assembly, including two outer diaphragms positioned to define an angle that is smaller than a sector plate sealing angle. The rotor module further includes a plurality of stay plates between the diaphragms to define basket modules.

According to other aspects illustrated herein, there is provided a semi-modular rotor module for an air preheater having a two pin lug assembly for engaging an air preheater post. The two pin lug assembly includes an upper two pin lug and a lower two pin lug and is configured to occupy a sector plate sealing angle $\beta$ having a vertex B. In one embodiment, the sector plate sealing angle $\beta$ is substantially equal to two (2) conventional sector angles $\alpha$. A plurality of diaphragms extend radially from the two pin lug assembly, including two outer diaphragms positioned to define a sub-angle $\gamma$ that is smaller than the sector plate sealing angle $\beta$ and which has a vertex common G that coincides with the vertex B. There is at least one diaphragm extending radially from the lug assembly between the two outer diaphragms, to define at least two interior angles $\phi$. The measure of $\phi$ is equal to the difference between the measures of $\beta$ and $\gamma$ which, in one embodiment, defines a DUPLEX SEALING™ rotor module described below (duplex sealing is a trademark of Alstom Power Inc., Windsor, Conn., USA) in that the additional diaphragm allows for at least three (3) seals per sector plate sealing angle instead of two seals seen in conventional arrangements. There is also a plurality of stay plates between the diaphragms to define basket modules.

According to other aspects illustrated herein, there is provided a rotor for an air preheater. The rotor comprises a post configured to receive a plurality of unitary rotor modules, the post includes a header having a header hole and a corresponding line-up pin for each unitary rotor module. The rotor further includes a plurality of semi-modular rotor modules on the post, each semi-modular rotor module engaging two adjacent header holes and two adjacent corresponding line-up pins on the post. Each semi-modular rotor module includes a two pin lug assembly for engaging the post, the lug assembly includes an upper two pin lug and a lower two pin lug and is configured to occupy a sector plate sealing angle. There is a plurality of diaphragms extending radially from the lug assembly, including two outer diaphragms positioned to define a sub-sector angle that is smaller than the sector plate sealing angle. Each semi-modular rotor module also includes a plurality of stay plates between the diaphragms to define basket modules. There are also stay plates in make-up pockets to define basket modules between adjacent semi-modular rotor modules. The rotor includes heat exchange elements in the basket modules.

According to other aspects illustrated herein, there is provided a rotor for an air preheater. The rotor includes a post configured to receive a plurality of unitary rotor modules, the post includes a header having a header hole and a corresponding line-up pin for each unitary rotor module. The rotor includes a plurality of semi-modular rotor modules on the post. Each semi-modular rotor module includes a two pin lug assembly for engaging the post, the two pin lug assembly including an upper two pin lug and a lower two pin lug and is configured to occupy a sector plate sealing angle $\beta$ having a vertex B. There are a plurality of diaphragms extending radially from the two pin lug assembly, including two outer diaphragms positioned to define a sub-angle $\gamma$ that is smaller than the sector plate sealing angle $\beta$ and has a vertex common G that coincides with the vertex B. Each semi-modular rotor module includes at least one diaphragm extending radially from the lug assembly between the two outer diaphragms and defining at least two interior angles $\phi$, wherein the measure of $\phi$ is equal to the difference between the measures of $\beta$ and $\gamma$. The rotor includes a plurality of stay plates between the diaphragms to define basket modules, and stay plates in make-up pockets to define basket modules between adjacent semi-modular rotor modules. The rotor also includes heat exchange elements in the basket modules.

Each semi-modular rotor module engages two adjacent header holes and two adjacent corresponding line-up pins on the post.

According to other aspects illustrated herein, there is provided a method of converting a modular rotor for an air preheater to a semi-modular rotor, the semi-modular rotor comprising a plurality of unitary rotor modules mounted on a post. The method comprises removing the unitary rotor modules from the post, replacing pairs of adjacent unitary rotor modules with semi-modular rotor modules that contain basket modules and that are configured to define make-up pockets between adjacent semi-modular rotor modules. Stay plates are field-assembled in the make-up pockets to provide basket modules in the make-up pockets, and heat exchange elements are disposed in the basket modules.

The above described and other features are illustrated by the following figures and detailed description.

BRIEF DESCRIPTION OF THE DRAWINGS

Referring now to the figures, which are exemplary embodiments, and wherein the like elements are numbered alike:

FIG. 4A is a partial schematic plan view of a prior art rotor;

FIG. 4B is a partial detail view of the portion of FIG. 4A labeled "Detail 'A'";

FIG. 5 is a partially cross-sectional detail view of a portion of FIG. 4A labeled "Detail 'B'";

DETAILED DESCRIPTION OF PREFERRED EMBODIMENTS

Figure 1:
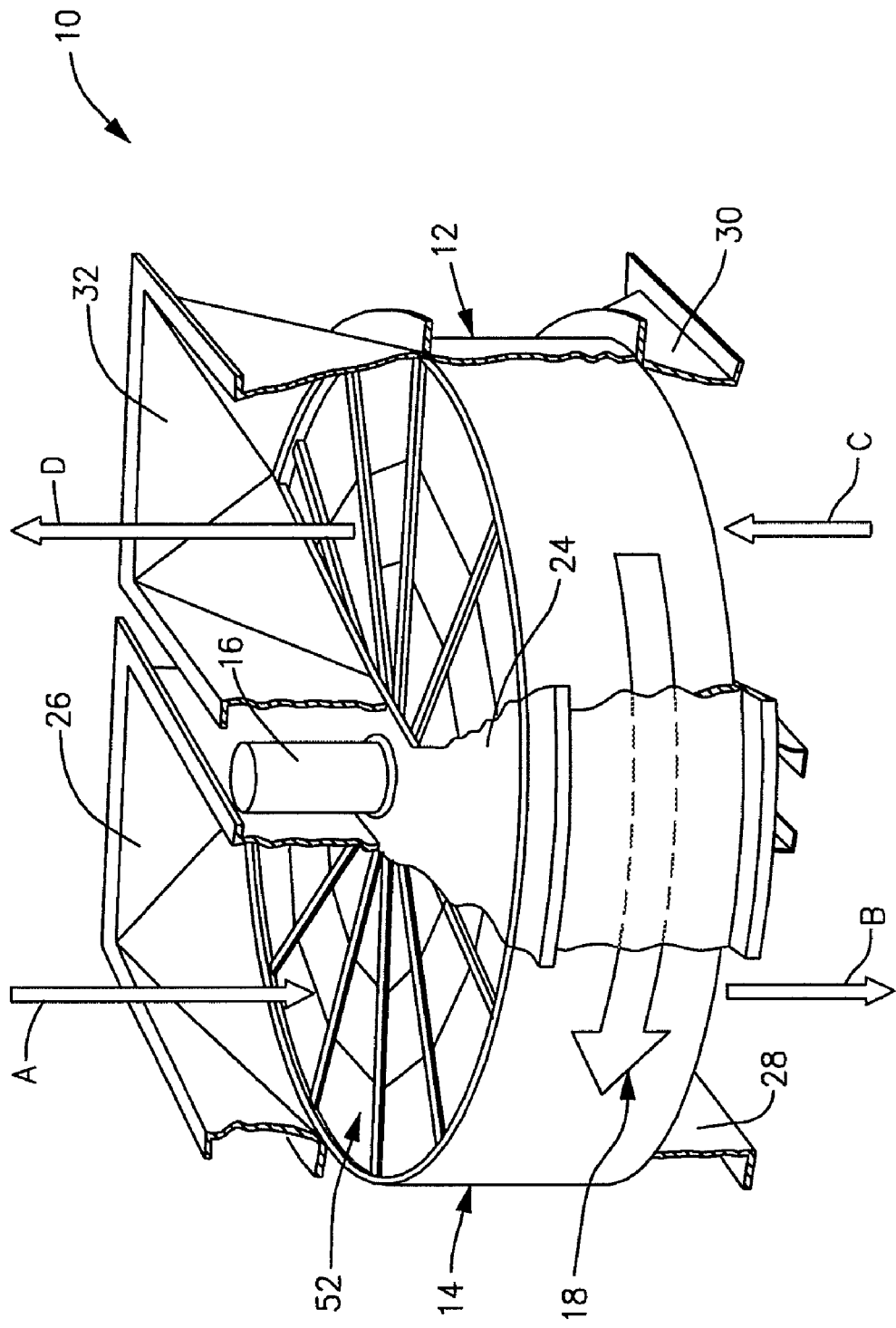
FIG. 1 is a partially cut-away perspective view of a modular air preheater that is modified according to one particular embodiment.
Figure 2:
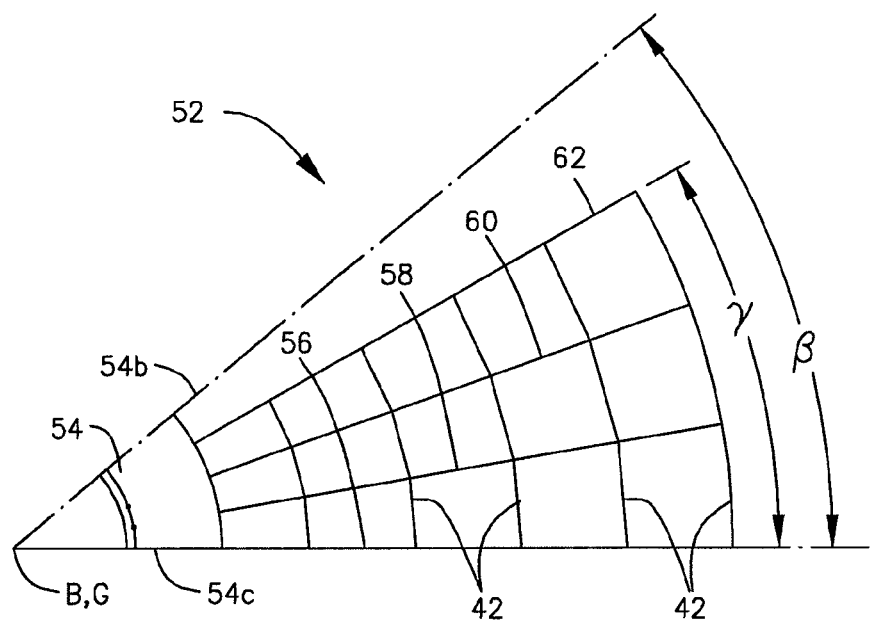
FIG. 2 is a schematic plan view of one embodiment of a semi-modular rotor module as described herein.
Figure 3:
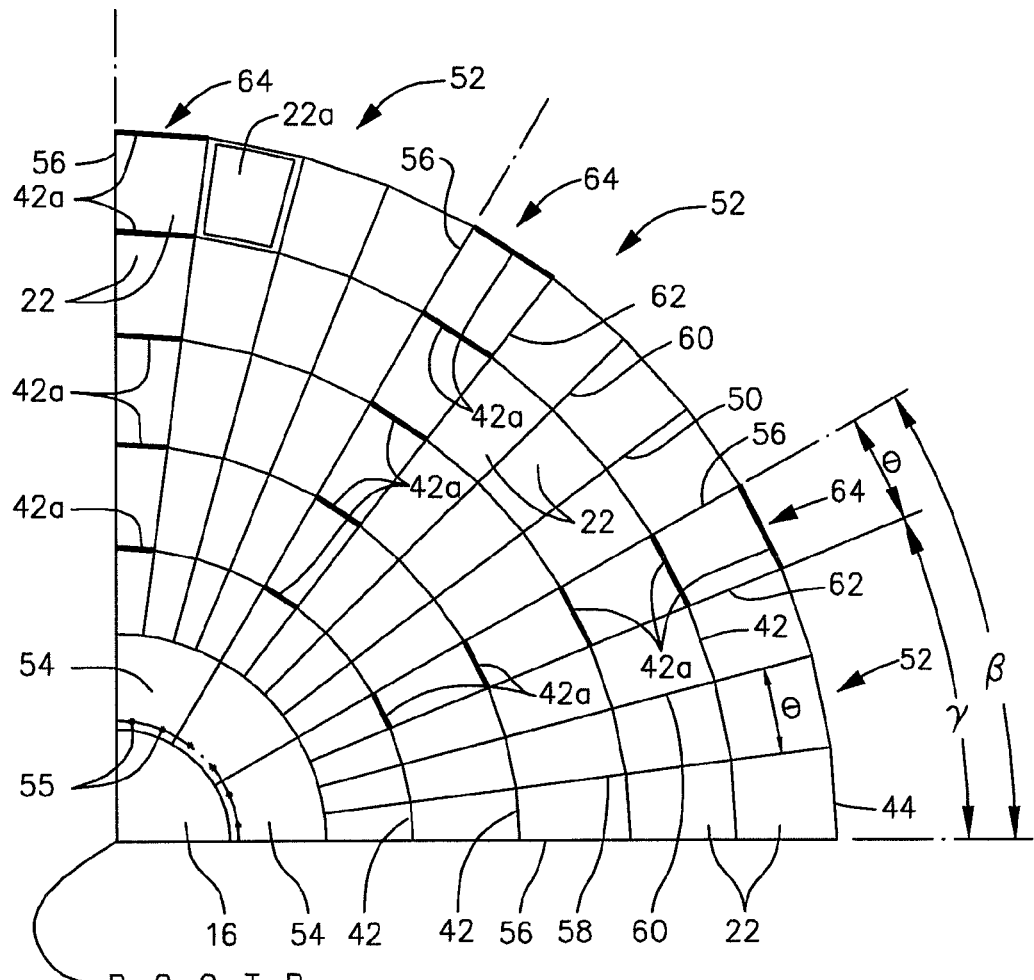
FIG. 3 is a partial schematic plan view of a modified rotor with semi-modular rotor modules of FIG. 2, with interconnecting stay plates mounted between adjacent semi-modular rotor modules.

FIG. 1 illustrates a modified modular air preheater as indicated generally at 10. The modified modular air preheater 10 includes a housing 12 in which a rotor 14 is mounted for rotation as indicated by an arrow 18. As shown in FIG. 2, the rotor 14 is a modular rotor comprised of a plurality of semi-modular rotor modules shown generally at 52. As shown in FIG. 3 the plurality of rotor modules 52 are mounted on a rotatable post 16 with interconnecting stay plates 42a between them. As described herein, each semi-modular rotor module 52 contains a plurality of radially-aligned rows of basket modules 22. The basket modules 22 contain heat exchange elements wherein, for clarity, only one of which is shown as a basketed heat exchange element 22a in FIG. 3. The basketed heat exchange elements provide heat exchange surfaces of the modified modular air preheater 10.

Referring again briefly to FIG. 1, the housing 12 is divided axially into a flue gas side where, for example, a gas inlet duct 26 is mounted, and an air side where, for example, an air inlet 30 is mounted, by means of a stationary, flow-impervious sector plate 24 at a first surface of the rotor 14 and a corresponding flow-impervious sector plate (not shown) located on a second surface of the rotor 14. Hot gases, for example, hot flue gases, enter the modular air preheater 10 through the gas inlet duct 26, flow through the rotor 14 (as indicated by arrow A) where heat is transferred from the flue gases to the rotor and the gases then exit through a gas outlet duct 28 (as indicated by the arrow B). A countercurrent flowing air enters through the air inlet 30 (as indicated by the arrow C), flows through the rotor 14 where it picks up heat from the rotor 14 and then the heated air exits through an air outlet duct 32 (as indicated by the arrow D).

In a conventional pre-modification configuration, the post 16 has a plurality of unitary rotor modules 20 mounted thereon, two of which are shown in FIG. 4A and FIG. 4B. Each unitary rotor module 20 has a lug assembly that includes an upper lug 36 and a lower lug (not shown) by which the unitary rotor module can be assembled onto the post 16. The unitary rotor module 20 is configured so that each of the lug assemblies has sides, for example, sides 36a, 36b, that define a sector angle α which has an apex at a central axis of the post 16 when the unitary rotor module is mounted on the post 16. The post 16 has an upper header 16a and a lower header (not shown) to which each unitary rotor module 20 is coupled. The upper header 16a and the lower header each comprise an annual shoulder around a core portion of the post 16 and holes by which the upper lugs 36 and the lower lugs are attached to the post 16 by a pin (not shown). In one embodiment, to facilitate assembly of the conventional configuration, each of the upper lugs 36 has, for example, a single lug hole 50 that aligns with a header hole 68 in the upper header 16a. For example, in FIG. 4B, one of the upper lug 36 is shown in phantom to reveal the header hole 68 beneath it, and the upper lug is retained on the post 16 by, for example, an axially-oriented (relative to the post 16) pin (not shown) inserted through the mutually aligned header hole 68 and lug hole 50. The lower header comprises radially oriented line-up pins (not shown in FIG. 4A), one of which is received in the lower lug of the lug assembly on each unitary rotor module 20. The holes in the upper header 16a and the lower header are distributed about the post 16 at angular intervals equal to the sector angle α.

As shown in FIGS. 4A and 5, conventionally each of the unitary rotor modules 20 includes a first diaphragm 38 and a second diaphragm 40 which extend from their respective lug assembly and which coincide with the sides 36a, 36b of the lug assembly. Accordingly, the first diaphragm 38 and second diaphragm 40 are arranged on the unitary rotor module 20 to conform to the sector angle α. All the unitary rotor modules 20 in the rotor 14 define the same sector angle α. As shown in FIG. 4A, the unitary rotor modules 20 have no interior diaphragms between the first diaphragm 38 and the second diaphragm 40 that define the sector angle α.

In conventional arrangements, the unitary rotor modules 20 are nominally configured so that they can be disposed in contiguous relationship to each other around the post 16. For example, each unitary rotor module 20 occupies a position about the center of the post 16 equal to the sector angle α, wherein the sector angle α is a whole-number fraction of three hundred sixty degrees (360°). Typically, the sector angle α may be about fifteen degrees (15°), so that twenty-four sectors are defined around the post 16. When these unitary rotor modules 20 are assembled onto a rotor 14, adjacent diaphragm plates 38, 40 of adjacent modules 20 are joined together by a fastener 34 as seen in FIG. 5, to form a dual-plate rotor diaphragm 46. One or more shims 48 are inserted between adjacent unitary rotor modules 20, for example, between the diaphragm 38 of one unitary rotor module and the diaphragm 40 of the adjacent unitary rotor module, to compensate for manufacturing variations in size of the unitary rotor modules 20 in order to attain a correct spacing to completely encircle the post 16. As also seen in FIG. 5, a seal 44 extends from the dual-plate rotor diaphragm 46 to engage the housing 12 as the rotor 14 rotates therein, to inhibit the flow of gas between the flue gas side and the air side of the conventional modular air preheater.

In accordance with one embodiment, the rotor 14 is modified by removal of the unitary rotor modules 20 from the post 16 and replacement of each of the unitary rotor modules 20 with semi-modular rotor modules shown generally at 52 in FIG. 2. Each of the semi-modular rotor modules 52 may be seen as replacing two (2) mutually adjacent unitary rotor modules 20. As described herein, each of the semi-modular rotor modules 52 includes a two pin lug assembly having an upper two pin lug 54 and a lower two pin lug (described below) configured to engage the post 16. In one embodiment, adjacent semi-modular rotor modules 52 are interconnected by stay plates 42a as seen in FIG. 3, and as discussed further below.

Figure 6:
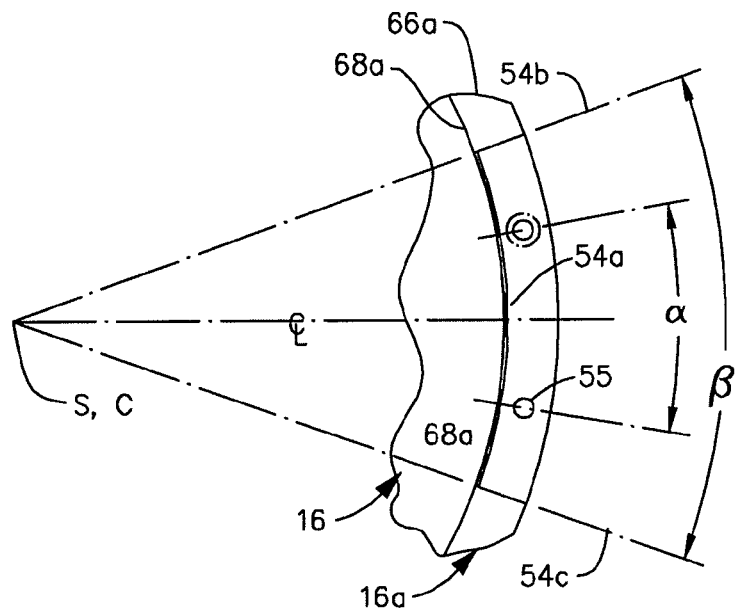
FIG. 6 is a partial plan view of one embodiment of a lug of a semi-modular rotor module as shown in FIG. 2 mounted on the post of a rotor.
Figure 7:
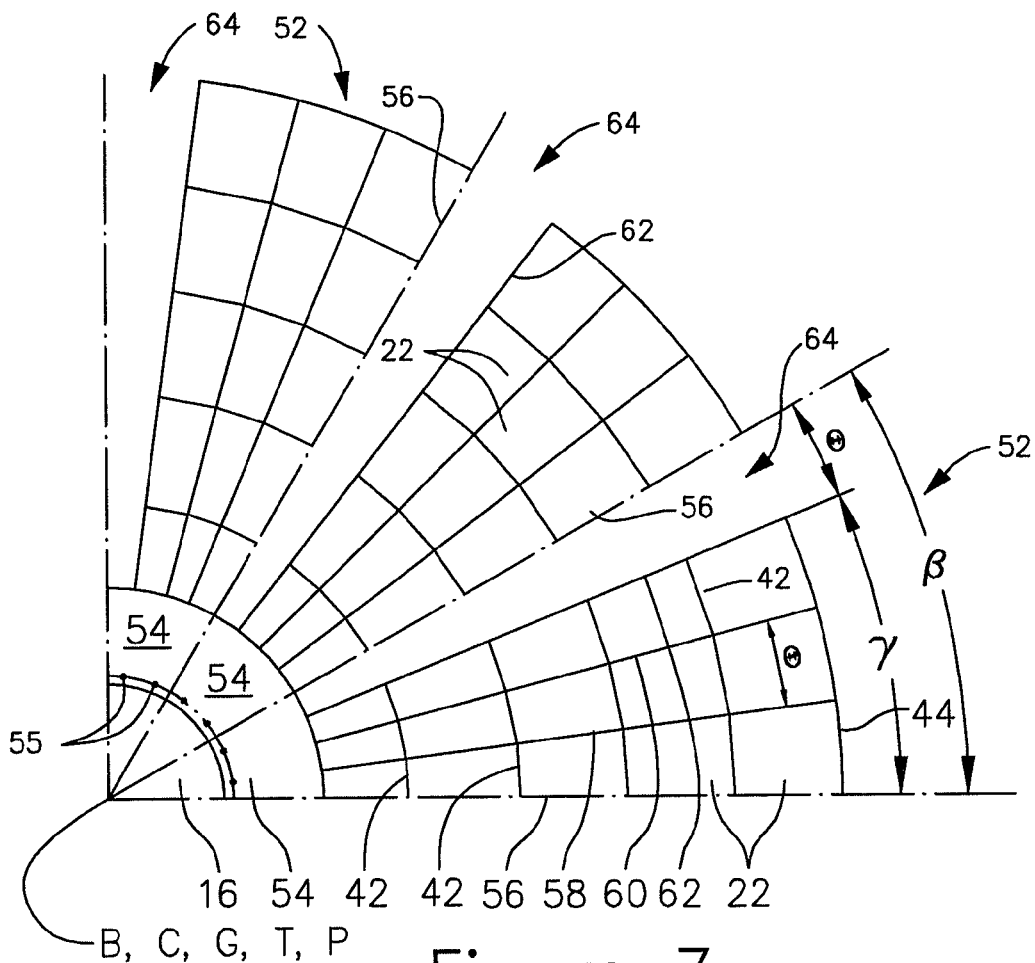
FIG. 7 is a partial plan view of a rotor showing a plurality of semi-modular rotor modules as shown in FIG. 2 prior to the insertion of interconnecting stay plates between adjacent semi-modular rotor modules.

Referring to FIGS. 2, 6 and 7, the upper two pin lug 54 has two sides 54b, 54c that define a sector plate sealing angle β having an apex B. In one embodiment, β is about twice the sector angle α, e.g., when the sector angle α is about fifteen degrees (15°), β is about thirty degrees (30°). In one embodiment, each of the upper two pin lugs 54 has two lug holes 55 that are alignable with two mutually adjacent header holes 68 (FIG. 8) on the post 16, which during installation receive a line-up or retaining pin 67. In one embodiment, the upper two pin lug 54 is configured so that the apex B coincides with the central axis C of the post 16 when the semi-modular rotor module 52 is mounted on the post 16, as seen in FIG. 7. As seen in FIG. 2, a plurality of diaphragms 56, 58, 60, 62 extend radially (relative to apex B) from the upper two pin lug 54. Stay plates 42 extend between and connect to adjacent diaphragms to form the basket modules 22. While the sector angle α is described as being about fifteen degrees (15°) and the sector plate sealing angles β are described as being about thirty degrees (30°), it should be appreciated that, in other embodiments, other values of α and β may be employed.

In one embodiment, shown in FIG. 6, the upper header 16a of the post 16 includes a shoulder 66a that surrounds a central core 68a, and the upper two pin lug 54 is configured with a post mating surface 54a having a concave configuration to conform to an exterior diameter of the central core 68a so that the lug holes 55 can be aligned with the header holes 68 and receive the line-up pin 67 (shown in FIG. 8) when the two pin lug 54 engages the central core 68a. The post mating surface 54a has a curvature defined by a center point S which coincides with the apex B and with the central axis C of the post 16 when the semi-modular rotor module 52 is mounted on the post (FIG. 6).

Figure 8:
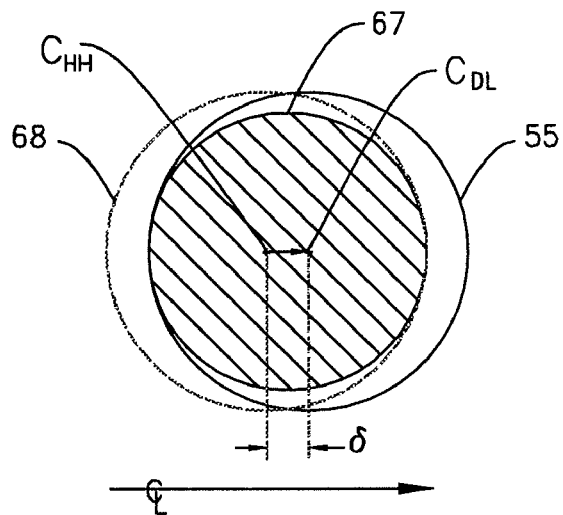
FIG. 8 is a schematic plan view of the holes in the lug and header in FIG. 6 with a pin therein.

In one embodiment, the lug holes 55 are situated in the upper two pin lug 54 such that when the post mating surface 54a engages the central core 68a, the lug holes 55 are each slightly displaced relative to a corresponding one of the header holes 68. For example, as indicated in FIG. 8, a center $C_{DL}$ of the two pin lug hole 55 is offset from a center $C_{HH}$ of the header hole 68. In one embodiment, the lug hole 55 is offset by an amount δ in a direction that is parallel to a centerline $C_L$ of the upper two pin lug 54, wherein the centerline $C_L$ emanates from the center of the post 16 and is half-way between the two lug holes 55 in the two pin lug 54. While FIG. 8 illustrates an embodiment where diameters of each of the lug holes 55 and the header holes 68 are substantially a same or similar diameter, one of lug hole 55 and header hole diameters may be larger in diameter. In one embodiment, the amount of offset δ of each of the lug holes 55 from the header holes 68 enables retaining pins 67, when inserted through the mutually aligned lug holes 55 and header holes 68, to better position the semi-modular rotor module 52 on the post 16. In one embodiment, the amount of offset δ is dependent upon the combination of all or some of the varying pin sizes, hole sizes, and angles of the lug itself.

Referring again to FIG. 2, the outermost diaphragms 56 and 62 of each semi-modular rotor module 52 define a sub-sector angle γ having an apex G that coincides with the apex B of the sector plate sealing angle β. In one embodiment, the sub-sector angle γ is less than the sector plate sealing angle β. For example, when the sector plate sealing angle β is about thirty degrees (30°), the sub-sector angle γ is about twenty-two and a half degrees (22.5°). Therefore, when two semi-modular rotor modules 52 are mounted adjacently on the post 16, a pocket shown generally at 64 is formed between them as shown in FIGS. 3 and 7. The pocket 64 is bounded by the outer most diaphragms 62 and 56 of adjacent semi-modular rotor modules 52, which also define a pocket angle θ of about seven and a half degrees (7.5°) between them. In one embodiment, the pocket angle θ has an apex T that coincides with apex B. Mathematically, the measure of the pocket angle θ is the difference between β and γ. In one embodiment, the pocket 64 is a make-up pocket in which interconnecting stay plates 42a are installed, for example, field-installed, as shown in FIG. 3 to extend from the outermost diaphragm 62 on one semi-modular rotor module 52 to a facing adjacent outermost diaphragm 56 on the adjacent semi-modular rotor module 52. The stay plates 42a form basket modules 22 therebetween. While the sector plate sealing angle β is described as being about thirty degrees (30°), the sub-sector angle γ is described as being about twenty two and a half degrees (22.5°), and the resulting pocket angle θ of about seven and a half degrees (7.5°), it should be appreciated that, in other embodiments, other values for the sector plate sealing angle β, the sub-sector angle γ, and the pocket angle θ may be employed.

In one embodiment, the adjacent diaphragms 56 and 58, 58 and 60, and 60 and 62 within each semi-modular rotor module 52 define equal interior angles φ between them, wherein each of the interior angles φ has an apex P that coincides with the apex B. As such, the interior diaphragms 58 and 60 evenly divide the sub-sector angle γ. In other embodiments, one or more of the interior angles φ may differ. In one embodiment, the pocket angle θ is equal to each interior angle φ. For example, in one embodiment, the pocket angle θ and the interior angles φ are both equal to one-half the conventional sector angle α. It should be appreciated that while specific relationships between θ, φ, and α are mentioned, in other embodiments, the stated angles may be related to each other in other ways. It should also be appreciated that since the measure of φ is equal to the difference between the measures of β and γ, in one embodiment, a DUPLEX SEALING™ rotor module is defined (duplex sealing is a trademark of Alstom Power Inc., Windsor, Conn., USA). For example, the DUPLEX SEALING™ rotor module includes an additional diaphragm within each semi-modular rotor modules 52 providing three (3) seals per sector plate sealing angle β instead of the conventional arrangement of two (2) seals. There is also a plurality of stay plates between the diaphragms to define basket modules.

Figure 9:
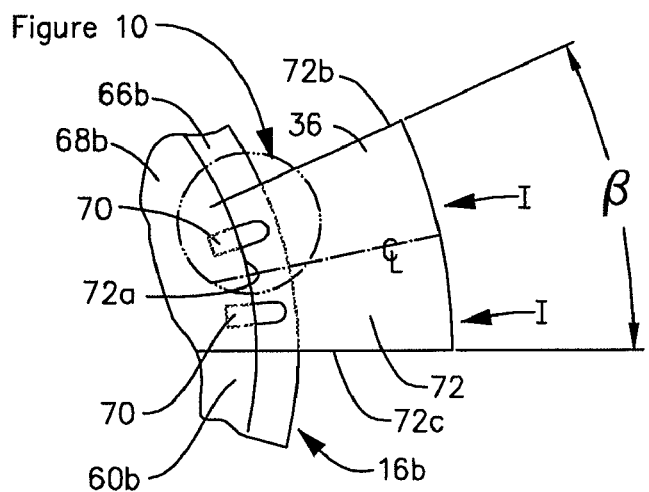
FIG. 9 is a partial schematic plan view of a lower lug portion of the modified rotor of FIG. 1 on the post.
Figure 10:
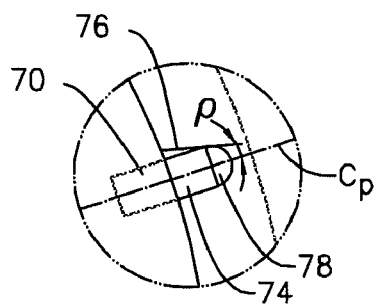
FIG. 10 is a partial plan detail view of a portion of FIG. 9 labeled "Detail 'C'".

As shown in FIGS. 9 and 10, the post 16 has a lower header portion 16b with a lower shoulder 66b, and a lower central core 68b, wherein a plurality of radially-oriented (relative to the post 16) line-up pins 70 are seated in and extend from radially-oriented holes in the central core 68b. As noted above, the lug assembly in the semi-modular rotor module 52 comprises a lower two (2) pin lug 72 that has a post mating surface 72a and two sides 72b and 72c which define the sector plate sealing angle β between them. In one embodiment, the post mating surface 72a has a radius of curvature that has a center that coincides with the central axis of the post 16 when the mating surface engages the lower central core 68b. In one embodiment, the lower two (2) pin lug 72 has a pair of slots 74 for receiving two mutually adjacent line-up pins 70 extending from the post 16. When the lower two(2) pin lug 72 engages the post 16, the slots 74 receive the two mutually adjacent line-up pins 70. In one embodiment, illustrated in FIG. 10, each of the slots 74 includes one side 76 that is machined at an angle ρ relative to a centerline Cp of the pin 70 that is about seven and one half degrees (7.5°). In one embodiment, the sides 76 of each of the slots 74 are parallel to a centerline $C_L$ of the lower two(2) pin lug 72. The centerline $C_L$ of the lower duplex lug 72 emanates from the center of the post 16 and is half-way between the pins 70. Accordingly, upon installation of the lower duplex lug 72 in an installation direction indicated by arrows I, the pins 70 are better able to position the semi-modular rotor module 52 on the post 16 by bearing against the sides 76 of the slots 74.

It should be appreciated that the semi-modular rotor modules 52, as described herein, provide a number of separate advantages over the prior art unitary rotor modules 20. For example, the semi-modular rotor modules 52 can be installed on the post 16 of the rotor 14 previously equipped with prior art unitary rotor modules 20, so that a prior art air preheater can be serviced or updated (i.e., modified as described herein) without replacing the post 16. Also, since each semi-modular rotor module 52 takes the place of two prior art unitary rotor modules 20, the re-assembly of the rotor is achieved with the installation of fewer modules, which reduces the time and effort required for the field assembly process. In addition, shimming and fastening steps as illustrated by FIG. 5 are substantially reduced if not eliminated.

In one embodiment, the amount of offset δ and diameter size difference between the lug holes 55 and the header holes 68 facilitates installation of the pins 70 therethrough without sacrificing structural integrity and while still maintaining the required position for the semi-modular rotor module 52. The slots 74 having sides 76 that are parallel to the centerline of the lug assemblies of the semi-modular rotor modules 52 facilitates installation of the semi-modular rotor modules 52 without the need to modify lower line-up pins in the lower rotor post header that were previously used for unitary rotor modules 20.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A semi-modular rotor module for an air preheater, comprising:
    a two-pin lug assembly for engaging an air preheater post, the two-pin lug assembly including an upper two-pin lug and a lower two-pin lug and being configured to occupy a sector plate sealing angle;
    a plurality of diaphragms extending radially from the two-pin lug assembly, including two outer diaphragms positioned to define a sub-sector angle that is less than the sector plate sealing angle; and
    a plurality of stay plates between the diaphragms to define basket modules.

2. The semi-modular rotor module of claim 1, comprising at least one diaphragm between the two outer diaphragms, to define at least two interior angles.

3. The semi-modular rotor module of claim 2, and wherein the at least one diaphragm defines uniform interior angles between the two outer diaphragms.

4. The semi-modular rotor module of claim 3, wherein the difference between the sub-sector angle and the sector plate sealing angle defines the uniform interior angles.

5. The semi-modular rotor module of claim 1, wherein the semi-modular rotor module has a centerline and wherein the lug assembly includes a slot for receiving a line-up pin, the line-up pin being offset from the centerline, and wherein the slot has a side that is parallel to the centerline.

6. A semi-modular rotor module for an air preheater, comprising:
    a two-pin lug assembly for engaging an air preheater post, the two-pin lug assembly including an upper two-pin lug and a lower two-pin lug and being configured to occupy a sector plate sealing angle β having a vertex B;
    a plurality of diaphragms extending radially from the two-pin lug assembly, including two outer diaphragms positioned to define a sub-duplex angle γ that is smaller than the sector plate sealing angle β and having a vertex common G that coincides with the vertex B;
    at least one diaphragm extending radially from the two-pin lug assembly between the two outer diaphragms and defining at least two interior angles φ, wherein the measure of φ is about equal to the difference between the measures of β and γ; and
    a plurality of stay plates between the diaphragms to define basket modules.

7. The semi-modular rotor module of claim 6, wherein the semi-modular rotor module has a centerline and wherein the two-pin lug assembly includes a slot for receiving a line-up pin offset from the centerline, and wherein the slot has a side that is parallel to the centerline.

8. The semi-modular rotor module of claim 6, wherein the measure of β is about thirty degrees (30°).

9. A rotor for an air preheater, comprising:
    a post configured to receive a plurality of unitary semi-modular rotor modules, the post having a header including a header hole and a corresponding line-up pin for each semi-modular rotor modules;
    a plurality of semi-modular rotor modules mounted on the post, each semi-modular rotor module engaging two adjacent header holes and two adjacent corresponding line-up pins on the post, and each semi-modular rotor module comprising a two-pin lug assembly for engaging the post, the two-pin lug assembly including an upper two-pin lug and a lower two-pin lug and being configured to occupy a sector plate sealing angle; a plurality of diaphragms extending radially from the two-pin lug assembly, including two outer diaphragms positioned to define a sub-sector angle that is less than the sector plate sealing angle;
    a plurality of stay plates disposed between the diaphragms to define basket modules, the stay plates in make-up pockets defined between adjacent semi-modular rotor modules; and
    heat exchange elements disposed in the basket modules.

10. The rotor of claim 9, comprising at least one diaphragm between the two outer diaphragms, to define at least two interior angles, and wherein the make-up pocket has a pocket angle that is equal to an interior angle.

11. The rotor of claim 9, wherein the semi-modular rotor module has a centerline and wherein the two-pin lug assembly includes a slot for receiving a line-up pin, the line-up pin being offset from the centerline, and wherein the slot has a side that is parallel to the centerline.

12. A rotor for an air preheater, comprising:

a post configured to receive a plurality of unitary semi-modular rotor modules, the post having a header including a header hole and a corresponding line-up pin for each unitary semi-modular rotor modules;

a plurality of semi-modular rotor modules mounted on the post, each semi-modular rotor module comprising a two-pin lug assembly for engaging an air preheater post, the two-pin lug assembly including an upper two-pin lug and a lower two-pin lug and being configured to occupy a sector plate sealing angle $\beta$ having a vertex B; a plurality of diaphragms extending radially from the two-pin lug assembly, including two outer diaphragms positioned to define a sub-sector angle $\gamma$ that is less than the sector plate sealing angle $\beta$ and having a vertex common G that coincides with the vertex B; at least one diaphragm extending radially from the lug assembly between the two outer diaphragms and defining at least two interior angles $\phi$, wherein the measure of $\phi$ is equal to the difference between the measures of $\beta$ and $\gamma$; and a plurality of stay plates between the diaphragms to define basket modules;

wherein each semi-modular rotor module engages two adjacent header holes and two adjacent corresponding line-up pins on the post; and further comprising stay plates in make-up pockets between adjacent semi-modular rotor modules; and heat exchange elements in the basket modules.

13. A method of converting a modular rotor for an air preheater to a semi-modular duplex rotor, the modular rotor comprising a plurality of unitary rotor modules mounted on a post, the method comprising:

removing the unitary rotor modules from the post;

replacing pairs of adjacent unitary rotor modules with a pre-assembled semi-modular rotor module that contains basket modules that are configured to define make-up pockets between adjacent semi-modular rotor modules; and field-assembling stay plates in the make-up pockets to provide basket modules in the make-up pockets; and disposing heat exchange elements in the basket modules.

* * * * *